United States Patent
Sakase et al.

(10) Patent No.: US 6,323,496 B1
(45) Date of Patent: Nov. 27, 2001

(54) APPARATUS FOR REDUCING DISTORTION IN FLUID BEARING SURFACES

(75) Inventors: Takao Sakase, Rowley; Theodore H. Smick, Essex; Geoffrey Ryding, Manchester, all of MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/293,955

(22) Filed: Apr. 19, 1999

(51) Int. Cl.[7] .................. H01J 37/317; H01J 37/18; F16J 15/40; F16C 32/06
(52) U.S. Cl. ............... 250/492.21; 250/441.11; 250/442.11; 277/913; 277/927; 277/637; 277/431; 384/121
(58) Field of Search ............. 250/492.21, 441.11, 250/442.11; 277/913, 927, 637, 431; 384/121

(56) References Cited

U.S. PATENT DOCUMENTS

| | | |
|---|---|---|
| 4,425,508 * | 1/1984 | Lewis, Jr. et al. ............. 250/442.11 |
| 5,003,183 | 3/1991 | Nogami et al. ............. 250/492.2 |
| 5,229,615 | 7/1993 | Brune et al. ............. 250/492.2 |

FOREIGN PATENT DOCUMENTS

WO 99 13488    3/1999   (WO).

* cited by examiner

*Primary Examiner*—Jack Berman
(74) *Attorney, Agent, or Firm*—Boult Wade Tennant

(57) ABSTRACT

A vacuum seal and fluid bearing apparatus for reducing the distortion of the bearing surfaces of a gas bearing is described. The apparatus includes a stator attached around an aperture in a vacuum housing and having a first planar fluid bearing surface. A movable member for closing the vacuum housing aperture having a second fluid bearing surface extending parallel to the first bearing surface is adapted to be supported spaced from the first bearing surface by a bearing fluid. A vacuum seal is provided between the movable member and the stator. In use, a force due to atmospheric pressure acts on the movable member in a direction normal to the bearing surfaces and a movable member includes a pressure relief structure to reduce any bending moment produced in the movable member by the force.

17 Claims, 2 Drawing Sheets

APPARATUS FOR REDUCING DISTORTION IN FLUID BEARING SURFACES

FIELD OF THE INVENTION

This invention relates to an apparatus for reducing the distortion of the bearing surfaces of a fluid bearing such as a gas bearing. The invention relates in particular to an ion implanter having such apparatus.

BACKGROUND OF THE INVENTION

As will be familiar to those skilled in the art, in a typical ion implanter a relatively small cross-section beam of dopant ions is scanned relative to a silicon wafer. Traditionally, a batch of wafers was mechanically scanned in two directions relative to a fixed direction ion beam.

With the advent of larger wafers, up to 300 mm in diameter, processing of a single wafer at a time becomes advantageous in terms of cost, reduced wastage etc. Accordingly, it is now desirable to scan an ion beam relative to a silicon wafer by mechanically scanning the wafer in a first direction and electrostatically or electromagnetically scanning or fanning the ion beam in a second direction.

There are a number of different configurations of single wafer processing machines. One example is described in WO99/13488 and other configurations are described in U.S. Pat. Nos. 5,003,183 and 5,229,615. In WO99/13488, the wafer is mounted upon a substrate holder in a process chamber of an implantation device. Attached to, or integral with, the substrate holder is an arm which extends through an aperture in the wall of the vacuum chamber. Mechanical scanning is effected by a scanning mechanism located outside the process chamber. The scanning mechanism is connected with the arm of the substrate holder and allows movement of the arm and hence the substrate holder relative to the process chamber.

To facilitate movement of the moving parts of the scanning mechanism, one or more gas bearings are provided. For example, the end of the arm distal from the substrate support may be attached to a first bearing member which moves reciprocally relative to a second bearing member. This allows the wafer to be mechanically scanned in a plane orthogonal to the ion beam of the ion implanter. Movement of the first bearing member relative to the second bearing member is facilitated via a first gas bearing.

Likewise, the second bearing member may itself be rotatable relative to the process chamber to allow tilting of the substrate support relative to the direction of the ion beam. The second bearing member rotates against a stator mounted upon a flange adjacent the aperture in the wall of the process chamber; a second gas bearing is employed between the stator and the surface of the second bearing member to facilitate this rotation.

For successful operation of the gas bearings, the bearing surfaces must each be flat. Variations in flatness of more than 10 $\mu$m or so can cause one of the bearing surfaces to touch the other bearing surface. Whilst the bearing surface of the second bearing member and that of the stator may be made flat to this accuracy, in use the second bearing member is subject to a vacuum on its inner side and to the force of atmospheric pressure on its outer non-bearing surface. This can lead to distortion of the second bearing member, particularly to "dishing" whereby the centre of the second bearing member tends to bow inwardly relative to its periphery. When this happens, the bearing surface of the second bearing member is no longer parallel to the bearing surface of the stator and thus a larger clearance must be maintained between the two surfaces for the gas bearing to operate successfully.

It is an object of the present invention to address this problem. More generally, it is an object of the invention to reduce the problems associated with distortion of the bearing surfaces in a fluid bearing.

SUMMARY OF THE INVENTION

These and other objects are achieved by the provision of a vacuum seal and fluid bearing apparatus for mounting a movable member in an aperture of a vacuum housing, the apparatus comprising: a stator for attachment about said vacuum housing aperture, the stator having a first planar fluid bearing surface, a movable member for closing the vacuum housing aperture, the movable member having a second fluid bearing surface extending parallel to said first bearing surface, said movable member being adapted to allow the second bearing surface to be supported spaced from said first bearing surface by a bearing fluid, and a vacuum seal provided between said movable member and said stator, whereby in use a force due to atmospheric pressure acts on said movable member in a direction normal to said bearing surfaces, the movable member including a pressure relief structure to reduce bending moment produced in said movable member by said force.

Preferably, said movable member comprises a plate having a first surface and said pressure relief structure comprises a plate having a first surface and a periphery secured to said first surface of said movable member, such that said movable member first surface and said pressure relief structure first surface define a volume therebetween.

Preferably, said pressure relief structure has a second surface opposed to said first surface, and further comprising means for generating a pressure differential between said first and second surfaces of said pressure relief structure.

In particular, said movable member may define an aperture communicating with said vacuum housing aperture, whereby in use said volume is under vacuum Advantageously, said pressure relief structure is secured to said movable member such that bending moment in said pressure relief structure is not communicated to said movable member.

The bearing fluid is preferably compressed air.

The movable member may be rotatable or, alternatively, may be movable linearly relative the stator.

In a further aspect of the invention, there is provided an ion implanter comprising: an ion beam generator to generate a beam of ions to be implanted, a process chamber into which the ion beam is directed, the process chamber having an aperture, a vacuum seal and fluid bearing apparatus for mounting a movable member in said aperture, the apparatus comprising a stator for attached about said aperture, the stator having a first planar fluid bearing surface; a movable member closing the aperture, the movable member having a second fluid bearing surface extending parallel to said first bearing surface, said movable member being adapted to allow the second bearing surface to be supported spaced from said first bearing surface by a bearing fluid, and a vacuum seal provided between said movable member and said stator, whereby in use a force due to atmospheric pressure acts on said movable member in a direction normal to said bearing surfaces, the movable member including a pressure relief structure to reduce bending moment produced in said movable member by said force.

BRIEF DESCRIPTION OF THE DRAWINGS

The invention may be put into practice in a number of ways, one embodiment of which will now be described by way of example only and with reference to the accompanying figures in which.

DESCRIPTION OF THE PREFERRED EMBODIMENT

Figure 1:
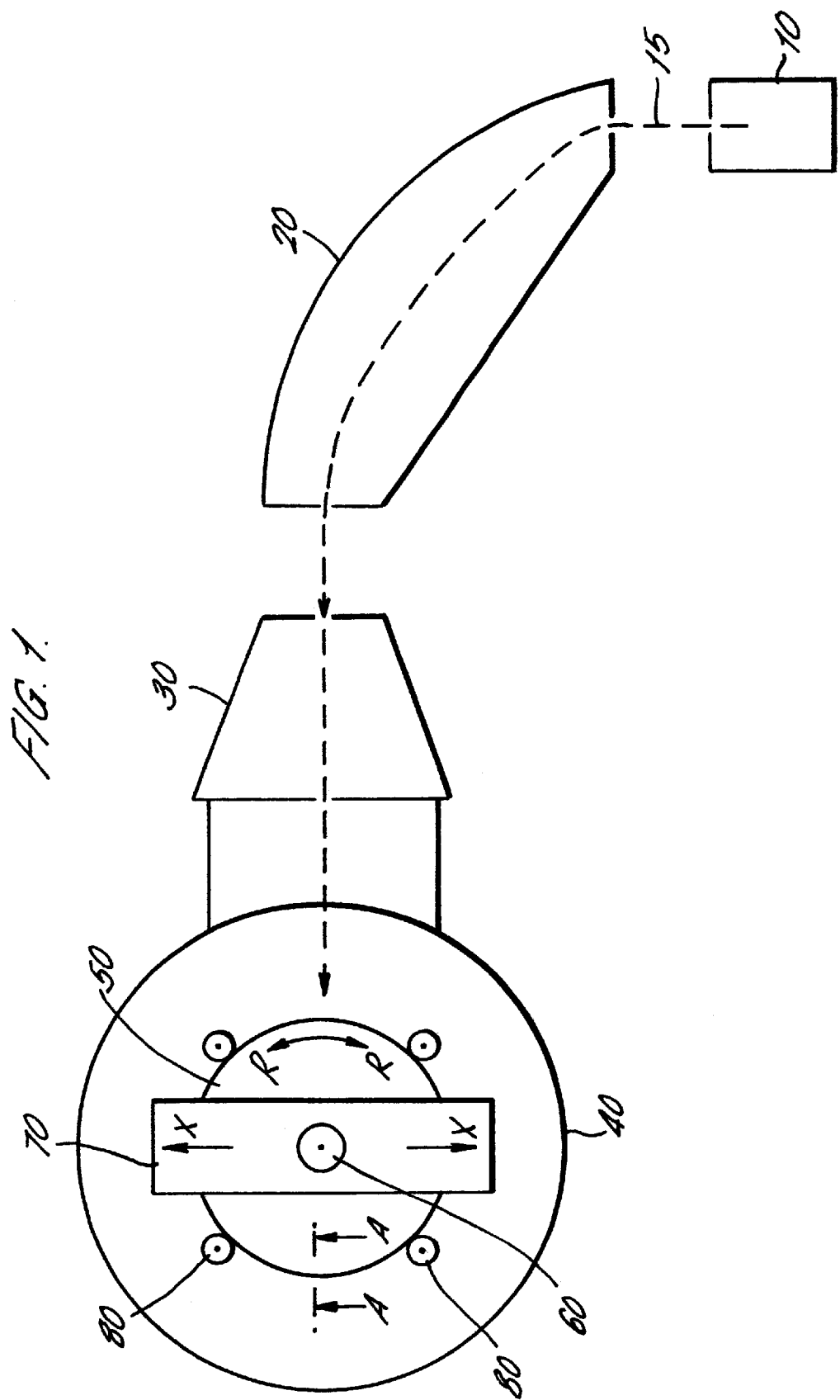
FIG. 1 shows a schematic side view of an ion implanter including a process chamber.

Referring first to FIG. 1, a schematic side view of an ion implanter is shown. The ion implanter includes an ion source 10 which is arranged to generatic a (typically collimated) ion beam 15. The ion beam 15 is directed into a mass analyser 20 where ions of a desired mass/charge ratio are selected electromagnetically. Such techniques are well-known to those skilled in the art and will not be detailed further.

The ion beam 15 exits the mass analyser 20 in a generally collimated stream. The ion beam exiting the mass analyser may be subject to electrostatic acceleration or deceleration of the ions, depending upon the type of ions to be implanted and the desired implantation depth.

Downstream of the mass analyser is a process chamber 40 containing a wafer to be implanted. In the present embodiment, the wafer is typically a large single wafer, approximately 300 mm in diameter.

The ion beam which exits the mass analyser 20 generally has a beam width and height which is substantially smaller than the diameter of the wafer to be implanted. It is for this reason that the beam needs to be scanned relative to the wafer. In the preferred embodiment, the ion beam is scanned electrostatically or electromagnetically in the first plane via an electrostatic/electromagnetic scanner 30. In the present example, the ion beam is scanned in a single plane which extends into and out of the page when viewing FIG. 1. The wafer itself is scanned mechanically in a second direction orthogonal to the direction of scanning of the ion beam. To scan the wafer mechanically, the wafer is mounted upon a substrate support. This consists of a plate onto which the wafer is mounted within the process chamber 40, and an elongate arm connected to the plate.

The elongate arm extends out through the wall of the process chamber in a direction generally parallel with the scanning plane of the ion beam. The arm passes through a slot (not shown) in a rotor plate 50 which is mounted adjacent to a side wall of the process chamber 40. The end 60 of the scanning arm is mounted within a scanning member 70. To effect mechanical scanning of the scanning arm (and hence the wafer mounted upon the plate) relative to the electrostatically/electromagnetically scanned ion beam, the scanning member 70 is movable in a reciprocating manner in the direction X shown in FIG. 1. To facilitate this scanning, the undersurface of the scanning member 70 is spaced from the upper surface of the rotor plate 50 by a cushion of compressed air which acts as an air bearing.

The scanning member 70 in FIG. 1 is shown in a vertical position such that the surface of the wafer is perpendicular to the plane of the scanned or fanned instant ion beam.

However, it may desirable to implant ions from the ion beam into the wafer at an angle. For this reason, the rotor plate 50 is rotatable about an axis defined through its centre, relative to the fixed wall of the process chamber 40. In other words, the rotor plate 50 is able to rotate in the direction R shown in FIG. 1.

As with the scanning member 70, movement of the rotor plate 50 relative to the wall of the process chamber is facilitated with an air bearing which lies between a surface of the rotor plate 50 and a surface of a stator (not shown in FIG. 1) mounted upon a flange extending from a wall of the process chamber 40. Radial movement of the rotor plate is constrained by a series of guide wheels 80 arranged around the circumference of the rotor plate 50. Unwanted axial movement of the rotor plate is prevented in use by the pressure differential between the two faces of the rotor plate. In particular, the inside of the process chamber is evacuated to prevent contamination of the wafer and ion beam and a large force due to atmospheric pressure accordingly acts to hold the rotor plate against the stator.

The mechanical scanning arrangement described above is that in the aforementioned WO99/13488, assigned to a common assignee, the contents of which are hereby incorporated in their entirety by reference.

Figure 2:
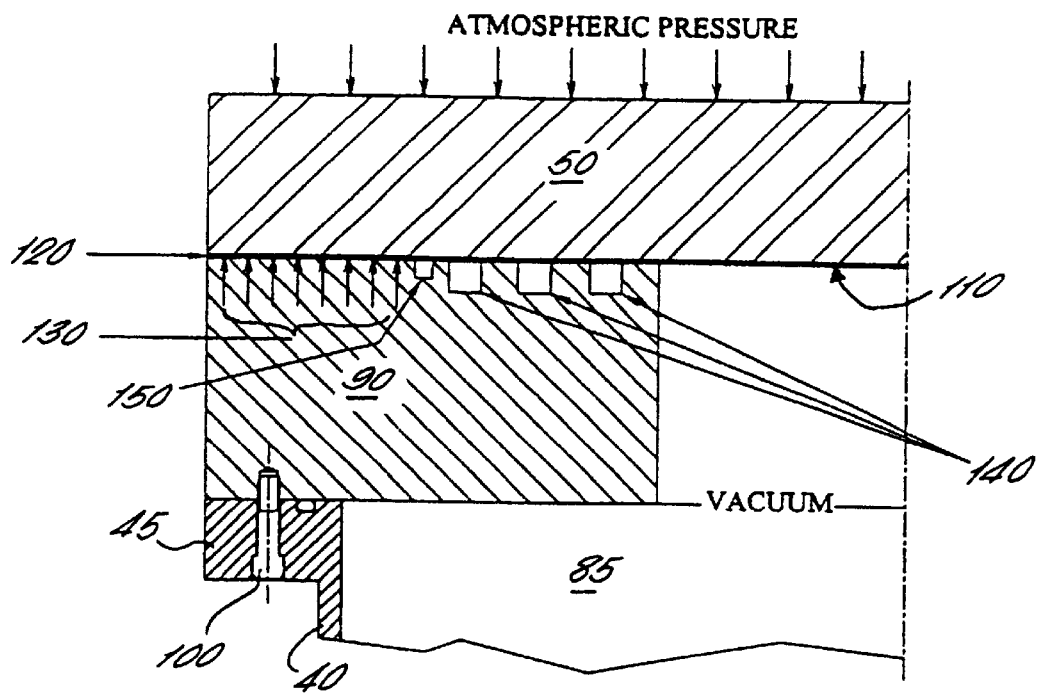
FIG. 2 shows a sectional view along the line A—A in the process chamber of FIG. 1, the process chamber including prior art apparatus.

Referring now to FIG. 2, a sectional view along the line A—A of the process chamber 40 of FIG. 1 is shown, in the case where the rotor plate and stator are mounted upon a flange extending from the wall of the process chamber 40 using a prior art arrangement.

The wall of the process chamber 40 has a generally circular aperture (indicated by reference numeral 85 in FIG. 2) in it. An annular flange 45 extends around the edge of the circular aperture 85 in the wall of the process chamber 40. A stator 90, whose purpose will be described below, is affixed to the flange 45, the stator 90 being substantially coaxial with the axis of the circular aperture 85. Fixing of the stator 90 to the flange 45 is achieved by a mounting fastener 100, such as a bolt. This passes through an opening in the flange 45 and into a corresponding threaded opening in a lower surface of the stator 90. It will be understood that, in order to effect clamping of the stator 90 to the flange 45, a plurality of mounting fasteners 100 are employed about the circumference of the flange 45.

The rotor plate 50 lies above an upper surface (as viewed in FIG. 2) of the stator 90. The rotor plate 50 acts as a closure for the process chamber 40. The lower surface 110 (as viewed in FIG. 2) of the rotor plate 50 acts as a first bearing surface, and the upper surface of the stator 90 acts as a second bearing surface. A supply of compressed air (not shown in FIG. 2) is connected to a series of compressed air channels in the stator 90 which are indicated schematically by arrows 130 in FIG. 2. Application of compressed air to the compressed air channels 130 creates a compressed air bearing 120 between the bearing surfaces of the rotor plate 50 and the stator 90.

The process chamber 40 is evacuated. The upper surface of the rotor plate 50 is, however, at atmospheric pressure. To allow rotational movement of the rotor plate 50 relative to the stator 90 on the compressed air bearing 120, whilst maintaining a vacuum within the process chamber 40, a series of differential pumping channels 140,150 are provided. Such channels for permitting a vacuum to be maintained adjacent a gas bearing are known in the art and do not form part of the present invention. Briefly however, the channels allow a graded pressure differential to be obtained between a first differential pumping chamber 150, which is a vent to atmosphere, and a last differential pumping channel 140 which is at high vacuum.

In order for the rotor plate to move swiftly over the stator 90, the thickness of the air bearing (ie. the gap between the lower surface 110 of the rotor plate 50 and the upper surface of the stator 90) needs to be highly uniform. A typical gap of 13 μm is desirable. Whilst it is possible without great difficulty to machine the lower surface 110 of the rotor plate 50 and the upper surface of the stator 90, to be flat to this degree, distortion forces arise in use due to the pressure differential between the upper surface of the rotor plate 50, which is at atmospheric pressure, and the lower surface 110 thereof, which is at a high vacuum (typically $10^{-4}$ Pa or more). Previously, in order to overcome the effect of these distortions, the pressure of the compressed air supplied to the compressed air bearing 120 was increased so that the two bearing surfaces were unable to touch in use. A typical compressed air bearing supply pressure of 80 psi (56 kPa) was needed to ensure this. Utilising the present invention, the air bearing supply pressure can be reduced to about 20 psi (14 kPa).

Figure 3:
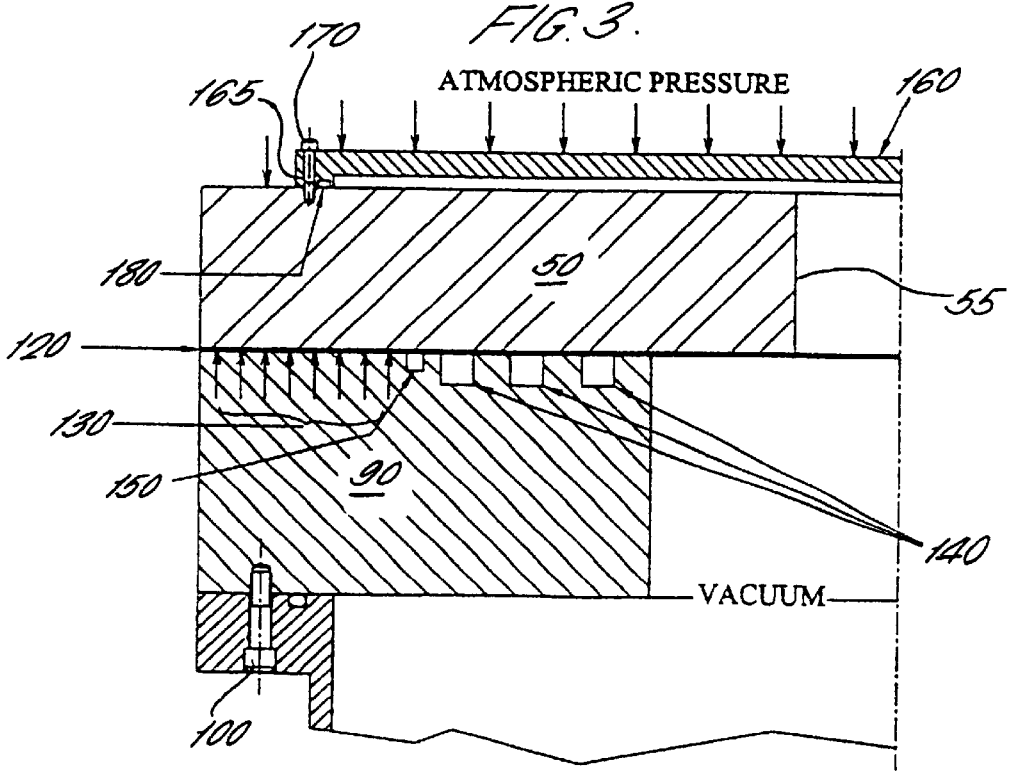
FIG. 3 shows a sectional view along the line A—A of the process chamber of FIG. 1, the process chamber including apparatus according to a preferred embodiment of the present invention.

Turning now to FIG. 3, a section along the line A—A of the process chamber of FIG. 1 is shown, with an apparatus embodying the present invention employed. Features common to FIGS. 2 and 3 are labelled with like reference numerals.

As in the case of FIG. 2, the stator 90 is secured to the flange 45 and the rotor plate 50 is supported above the bearing surface of the stator 90 on a gas bearing 120. However, in this case a pressure relief plate 160 is secured to the outer surface of the rotor plate 50. The pressure relief plate 160 is secured to the rotor plate 50 around its periphery by mounting fasteners such as bolts 170, only one of which is shown in FIG. 3, extending through a peripheral flange 165. A seal 180 such as an o-ring may be provided between the peripheral flange 165 and the rotor plate 50. Inward of the peripheral flange 165, the pressure relief plate 160 is spaced from the upper surface of the rotor plate 50. One or more openings 55 are provided through the rotor plate 50 so that the gap between the rotor 50 and the pressure relief plate 160 is in communication with the interior of the chamber and thus at high vacuum. The outer surface of the pressure relief plate 60 is subject to atmospheric pressure.

The fasteners 170 which secured pressure relief plate 160 to the rotor plate 50 are preferably arranged so as to be exactly in line with the primary line of action of the gas bearing 120 so that the peripheral flange 165 of the pressure relief plate 160 is not subject to any significant torque which could distort the periphery of the plate 160 and the rotor plate 50.

With this arrangement, only a small annular band at the outer periphery of the rotor plate 50 is subject to atmospheric pressure. The majority of the upper surface of the rotor plate 50 is subject to vacuum, as is its inner surface, and therefore the distortion or dishing caused by atmospheric pressure in the arrangement shown in FIG. 2 is avoided. In this way the bearing surface of the rotor plate 50 can be maintained parallel to the bearing surface of the stator 90. Therefore, the spacing required between the two bearing surfaces and hence the pressure of compressed air required to maintain this spacing can be reduced. As mentioned above, utilising the present invention, the air bearing supply pressure can be reduced to about 20 psi (14 kPa). In addition the smaller spacing leads to reduced leakage of air at the outer periphery of the bearing and between the differential pumpimg channels of the vacuum seal, thereby increasing the efficiency of the seal.

Additionally, providing one or more openings 55 through the rotor plate 50 reduces the weight and quantity of material required for the rotor plate. The overall structure may be considerably lighter and use less material than a single rotor plate, without a pressure relief plate, which is made stiff enough to resist distortion due to atmospheric pressure.

The skilled person will appreciate that the present invention is applicable to any gas bearing in which a rotor is mounted on a stator and is subject to a large pressure differential which may cause it to distort, thereby bringing the bearing surfaces out of parallel alignment. Embodiments of the invention have been described in connection with a rotor plate, arranged to rotate upon an air bearing above the stator which is in turn mounted upon the flange in an ion implanter. However, it will be appreciated that the invention may be employed in other cases where it is desirable to reduce distortion of the bearing surfaces of a fluid bearing. As set out above, the scanning member 70 in FIG. 1 moves relative to the rotor plate 50 on a further air bearing and the apparatus could be employed in conjunction with that air bearing as well. Indeed, the invention is not restricted to ion implanters and may be useful in other situations where it is desirable to avoid distortion forces so that two opposing bearing surfaces may be maintained flat relative to each other.

Likewise, although in the described embodiments compressed air has been provided into the gas support region, any suitable fluid may be used.

Although the present invention has been described with reference to preferred embodiments, those skilled in the art will recognise that changes may be made in form and detail without departing from the spirit and scope of the invention, which is to be determined in accordance with the appended claims.

What is claimed is:

1. A vacuum seal and fluid bearing apparatus for mounting a movable member in an aperture of a vacuum housing, the apparatus comprising:

a stator for attachment about said vacuum housing aperture, the stator having a first planar fluid bearing surface, a movable member for closing the vacuum housing aperture, the movable member having a second fluid bearing surface extending parallel to said first bearing surface, said movable member being adapted to allow the second bearing surface to be supported spaced from said first bearing surface by a bearing fluid, and a vacuum seal provided between said movable member and said stator, whereby in use a force due to atmospheric pressure acts on said movable member in a direction normal to said bearing surfaces, the movable member including a pressure relief structure to reduce bending moment produced in said movable member by said force.

2. An apparatus as claimed in claim 1, wherein said movable member comprises a plate having a first surface and said pressure relief structure comprises a plate having a first surface and a periphery secured to said first surface of said movable member, such that said movable member first surface and said pressure relief structure first surface define a volume therebetween.

3. An apparatus as claimed in claim 2, wherein said pressure relief structure has a second surface opposed to said first surface, and further comprising means for generating a pressure differential between said first and second surfaces of said pressure relief structure.

4. An apparatus as claimed in claim 3, wherein said movable member defines an aperture communicating with said vacuum housing aperture, whereby in use said volume is under vacuum.

5. An apparatus as claimed in claim 1, wherein said pressure relief structure is secured to said movable member such that bending moment in said pressure relief structure is not communicated to said movable member.

6. An apparatus as claimed in claim 1, wherein said bearing fluid is compressed air.

7. An apparatus as claimed in claim 1, wherein said movable member is rotatable relative to said stator.

8. An apparatus as claimed in claim 1, wherein said movable member is movable linearly relative to said stator.

9. An ion implanter comprising:

an ion beam generator to generate a beam of ions to be implanted, a process chamber into which the ion beam is directed, the process chamber having an aperture, a vacuum seal and fluid bearing apparatus for mounting a movable member in said aperture, the apparatus comprising a stator for attached about said aperture, the stator having a first planar fluid bearing surface;

a movable member closing the aperture, the movable member having a second fluid bearing surface extending parallel to said first bearing surface, said movable member being adapted to allow the second bearing surface to be supported spaced from said first bearing surface by a bearing fluid, and a vacuum seal provided between said movable member and said stator, whereby in use a force due to atmospheric pressure acts on said movable member in a direction normal to said bearing surfaces, the movable member including a pressure relief structure to reduce bending moment produced in said movable member by said force.

10. An ion implanter as claimed in claim 9, wherein said movable member comprises a plate having a first surface and said pressure relief structure comprises a plate having a first surface and a periphery secured to said first surface of said movable member, such that said movable member first surface and said pressure relief structure first surface define a volume therebetween.

11. An ion implanter as claimed in claim 10, wherein said pressure relief structure has a second surface opposed to said first surface, and further comprising means for generating a pressure differential between said first and second surfaces of said pressure relief structure.

12. An ion implanter as claimed in claim 11, wherein said movable member defines an aperture communicating with said vacuum housing aperture, whereby said volume is under vacuum.

13. An ion implanter as claimed in claim 9, wherein said pressure relief structure is secured to said movable member such that bending moment in said pressure relief structure is not communicated to said movable member.

14. An ion implanter as claimed in claim 9, wherein said bearing fluid is compressed air.

15. An ion implanter as claimed in claim 9, wherein said movable member is rotatable relative to said stator.

16. An ion implanter as claimed in claim 9, wherein said movable member is movable linearly relative to said stator.

17. A vacuum seal and fluid bearing apparatus for mounting a movable means in an aperture of a vacuum housing, the apparatus comprising:

a stator for attachment about said vacuum housing aperture, the stator having a first planar fluid bearing surface, means for closing the vacuum housing aperture, said means having a second fluid bearing surface extending parallel to said first bearing surface, said means being adapted to allow the second bearing surface to be supported spaced from said first bearing surface by a bearing fluid to allow the means to move relative to said stator, and means to provide a vacuum seal between said movable means and said stator, whereby in use a force due to atmospheric pressure acts on said movable means in a direction normal to said bearing surfaces, the movable means including a pressure relief means to reduce bending moment produced in said movable means by said force.

* * * * *